United States Patent [19]

Zones

[11] Patent Number: 4,963,337

[45] Date of Patent: Oct. 16, 1990

[54] ZEOLITE SSZ-33

[75] Inventor: Stacey I. Zones, San Francisco, Calif.

[73] Assignee: Chevron Research Company, San Francisco, Calif.

[21] Appl. No.: 377,358

[22] Filed: Jul. 7, 1989

[51] Int. Cl.$^5$ .................. C01B 33/34; C01B 35/10
[52] U.S. Cl. .................. 423/277; 423/326; 423/328; 423/594; 423/600
[58] Field of Search ............ 423/328 C, 328 T, 277, 423/600, 594, 326

[56] References Cited

U.S. PATENT DOCUMENTS 4,420,467 12/1983 Whittam .................. 423/328

Primary Examiner—Robert L. Skoll
Assistant Examiner—Stuart L. Hendrickson
Attorney, Agent, or Firm—T. G. De Jonghe; C. E. Rincon

[57] ABSTRACT

A crystalline zeolite SSZ-33 is prepared using a quaternary ion as a template.

20 Claims, No Drawings

ZEOLITE SSZ-33

BACKGROUND OF THE INVENTION

Natural and synthetic zeolitic crystalline aluminosilicates are useful as catalysts and adsorbents. These aluminosilicates have distinct crystal structures which are demonstrated by X-ray diffraction. The crystal structure defines cavities and pores which are characteristic of the different species. The adsorptive and catalytic properties of each crystalline aluminosilicate are determined in part by the dimensions of its pores and cavities. Thus, the utility of a particular zeolite in a particular application depends at least partly on its crystal structure.

Because of their unique molecular sieving characteristics, as well as their catalytic properties, crystalline aluminosilicates are especially useful in such applications as gas drying and separation and hydrocarbon conversion. Although many different crystalline aluminosilicates and silicates have been disclosed, there is a continuing need for new zeolites and silicates with desirable properties for gas separation and drying, hydrocarbon and chemical conversions, and other applications.

Crystalline aluminosilicates are usually prepared from aqueous reaction mixtures containing alkali or alkaline earth metal oxides, silica, and alumina. "Nitrogenous zeolites" have been prepared from reaction mixtures containing an organic templating agent, usually a nitrogen-containing organic cation. By varying the synthesis conditions and the composition of the reaction mixture, different zeolites can be formed using the same templating agent. Use of N,N,N-trimethyl cyclopentylammonium iodide in the preparation of Zeolite SSZ-15 molecular sieve is disclosed in U.S. Pat. No. 4,610,854; use of 1-azoniaspiro[4.4] nonyl bromide and N,N,N-trimethyl neopentylammonium iodide in the preparation of a molecular sieve termed "Losod" is disclosed in Helv. Chim. Acta (1974); vol. 57, p. 1533 (W. Sieber and W. M. Meier); use of quinuclidinium compounds to prepare a zeolite termed "NU-3" is disclosed in European Patent Publication No. 40016; use of 1,4-di(1-azoniabicyclo[2.2.2.]octane) lower alkyl compounds in the preparation of Zeolite SSZ-16 molecular sieve is disclosed in U.S. Pat. No. 4,508,837; use of N,N,N-trialkyl-l-adamantamine in the preparation of Zeolite SSZ-13 molecular sieve is disclosed in U.S. Pat. No. 4,544,538, and for SSZ-24 in U.S. Pat. No. 4,665,110.

Synthetic zeolitic crystalline borosilicates are useful as catalysts. Methods for preparing high silica content zeolites that contain framework boron are known and disclosed in U.S. Pat. No. 4,269,813. The amount of boron contained in the zeolite usually may be made to vary by incorporating different amounts of borate ion in the zeolite forming solution.

The use of a quaternary ammonium compound in the preparation of a boron-containing zeolite is disclosed in European Patent Application No. 188,913. A method for treating a zeolite containing aluminum and boron with a silicon substitution treatment is disclosed in U.S. Pat. No. 4,701,313.

The present invention relates to a novel family of stable synthetic crystalline materials characterized as borosilicates identified as SSZ-33 and having a specified X-ray diffraction pattern, and also to the preparation and use of such materials.

SUMMARY OF THE INVENTION

We have prepared a family of crystalline borosilicate molecular sieves with unique properties, referred to herein as "Zeolite SSZ-33" or simply as "SSZ-33", and have found highly effective methods for preparing SSZ-33. Also, advantageous uses for SSZ-33 have been discovered.

Thus, according to the present invention, a zeolite composition, SSZ-33, is provided.

SSZ-33 has a mole ratio of an oxide selected from silicon oxide, germanium oxide, and mixtures thereof to an oxide selected from boron oxide or mixtures of boron oxide with aluminum oxide, gallium oxide, or iron oxide greater than about 20:1; contains greater than 100 ppm boron and has an X-ray diffraction pattern in accordance with Table 1(a) below.

The SSZ-33 zeolite preferably has a composition, as synthesized and in the anhydrous state, in terms of mole ratios of oxides as follows: (1.0 to 5)$Q_2O$:(0.1 to 1.0)$M_2O$:$W_2O_3$ (greater than 20)$YO_2$ wherein M is an alkali metal cation, W is selected from boron, Y is selected from silicon, germanium and mixtures thereof, and Q is a tricyclodecane quaternary ammonium ion.

SSZ-33 zeolites preferably have a $YO_2$:$W_2O_3$ mole ratio greater than about 20:1 and can be made essentially alumina free. As prepared, the silica:boron oxide ratio is typically in the range of 20:1 to about 100:1. Higher mole ratios can be obtained by treating the zeolite with chelating agents or acids to extract boron from the zeolite lattice. The silica:boron oxide mole ratio can also be increased by using silicon and carbon halides and other similar compounds.

The boron in the crystalline network may also be replaced by aluminum using the procedures described in U.S. Pat. Nos. 4,559,315 and 4,550,092 which are hereby incorporated by reference.

According to one embodiment of the present invention, a method is provided for making SSZ-33 zeolites, comprising preparing an aqueous mixture containing sources of a tricyclodecane quaternary ammonium ion, boron oxide, and an oxide selected from silicon oxide, germanium oxide, and mixtures thereof. The aqueous mixture has a composition, in terms of mole ratios of oxides falling within the following ranges: $YO_2/W_2O_3$, 20:1 to about 100:1; $Q/YO_2$, 0.05:1 to 0.50:1 (wherein Y is selected from silicon, germanium, and mixtures thereof, W is selected from boron, and Q is a tricyclodecane quaternary ammonium ion). The mixture is maintained at a temperature of at least 100° C. until the crystals of said zeolite are formed and the crystals are recovered.

A zeolite having the same X-ray diffraction pattern as the SSZ-33 zeolite is described in our application U.S. Ser. No. 172,737 entitled "New Zeolite SSZ-26". As synthesized using the method described therein, this zeolite contains primarily silica and alumina. The method for preparing SSZ-26 described in U.S. Ser. No. 172,737 cannot be used to make the boron-containing SSZ-33. Additionally, SSZ-33 cannot be prepared by replacing the aluminum with boron in the synthesized SSZ-26 structure. Successful preparation of the boron-containing SSZ-33 structure requires using a new synthesis method described herein.

SSZ-33 has the same X-ray diffraction pattern as SSZ-26 but SSZ-33 is made using a template described in our application U.S. Ser. No. 260,439 entitled "New Zeolite SSZ-31". The template described in Ser. No. 260,439 is used to make a new all silicate or aluminosilicate zeolite SSZ-31. This template is a tricyclodecane quaternary ammonium template.

Among other factors, the present invention is based on our finding that a new boron-containing zeolite, SSZ-33, emerges by using boron and a template which was used to prepare SSZ-31. Surprisingly, the X-ray diffraction pattern of SSZ-33 is the same as that of SSZ-26, although SSZ-33 is not made using the original propellane-based SSZ-26 template. We have also found that the SSZ-33 zeolite has unexpectedly outstanding hydrocarbon conversion properties, particularly including catalytic cracking properties and reforming properties with high sulfur tolerance.

DETAILED DESCRIPTION OF THE INVENTION

SSZ-33 zeolites, as synthesized, have a crystalline structure whose X-ray powder diffraction pattern shows the following characteristic lines:

TABLE 1(a)

| $2\theta$ | d/n | $100 \times I/I_o$ |
|---|---|---|
| 7.86 | 11.25 | 90 |
| 20.48 | 4.336 | 100 |
| 21.47 | 4.139 | 40 |
| 22.03 | 4.035 | 90 |
| 23.18 | 3.837 | 64 |
| 26.83 | 3.323 | 40 |

Typical SSZ-33 borosilicate and calcined borosilicate zeolites have the X-ray diffraction pattern of Tables 2 and 4 below.

The X-ray powder diffraction patterns were determined by standard techniques. The radiation was the K-alpha/doublet of copper and a scintillation counter spectrometer with a strip-chart pen recorder was used. The peak heights I and the positions, as a function of $2\theta$ where $\theta$ is the Bragg angle, were read from the spectrometer chart. From these measured values, the relative intensities, $100I/I_o$, where $I_o$ is the intensity of the strongest line or peak, and d, the interplanar spacing in Angstroms corresponding to the recorded lines, can be calculated.

The X-ray diffraction pattern of Table 1(a) is characteristic of SSZ-33 zeolites. The zeolite produced by exchanging the metal or other cations present in the zeolite with various other cations yields substantially the same diffraction pattern although there can be minor shifts in interplanar spacing and minor variations in relative intensity. Minor variations in the diffraction pattern can also result from variations in the organic compound used in the preparation and from variations in the silica-to-boron mole ratio from sample to sample. Calcination can also cause minor shifts in the X-ray diffraction pattern. Notwithstanding these minor perturbations, the basic crystal lattice structure remains unchanged.

After calcination, the SSZ-33 zeolites have a crystalline structure whose X-ray powder diffraction pattern shows the characteristic lines as indicated in Table 1(b) below.

TABLE 1(b)

| $2\theta$ | d/n | $100 \times I/I_o$ |
|---|---|---|
| 7.81 | 11.32 | 100 |
| 20.43 | 4.347 | 46 |
| 21.44 | 4.144 | 9 |
| 22.02 | 4.037 | 41 |
| 23.18 | 3.837 | 28 |
| 26.80 | 3.326 | 31 |

SSZ-33 zeolites can be suitably prepared from an aqueous solution containing sources of an alkali metal oxide, a tricyclo[5.2.1.0$^{2,6}$]decane quaternary ammonium ion, boron oxides, and an oxide of silicon or germanium, or mixture of the two. The reaction mixture should have a composition in terms of mole ratios falling within the following ranges:

|  | Broad | Preferred |
|---|---|---|
| $YO_2/W_2O_3$ | 20–200 | 30–60 |
| $OH/YO_2$ | 0.10–1.0 | 0.20–0.30 |
| $Q/YO_2$ | 0.05–0.50 | 0.10–0.25 |
| $M+/YO_2$ | 0.05–0.30 | 0.05–0.15 |
| $H_2O/YO_2$ | 15–300 | 25–60 |
| $Q/Q+M+$ | 0.30–0.70 | 0.40–0.60 | wherein Q is a (tricyclo[5.2.1.0$^{2,6}$]decane) quaternary ammonium ion, Y is silicon, germanium or both, and W is boron. M is an alkali metal, preferably sodium. The organic compound which acts as a source of the quaternary ammonium ion employed can provide hydroxide ion.

The tricyclodecane quaternary ammonium ion component Q, of the crystallization mixture, is derived from the quaternary ammonium compound. Preferably, the tricyclo[5.2.1.0$^{2,6}$]decane quaternary ammonium ion is derived from a compound of the formula:

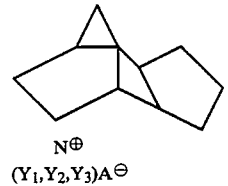

$N^{\oplus}$
$(Y_1,Y_2,Y_3)A^{\ominus}$ wherein each of $Y_1$, $Y_2$, and $Y_3$ independently is a lower alkyl and most preferably methyl; $A^{\ominus}$ is an anion which is not detrimental to the formation of the zeolite.

The quaternary ammonium compounds are prepared by methods known in the art.

By "lower alkyl" is meant alkyl of from about 1 to 3 carbon atoms.

$A^{\ominus}$ is an anion which is not detrimental to the formation of the zeolite. Representative of the anions include halogens, such as fluoride, chloride, bromide and iodide, hydroxide, acetate, sulfate, carboxylate. Hydroxide is the most preferred anion. It may be beneficial to ion exchange, for example, the halide for hydroxide ion, thereby reducing or eliminating the alkali metal hydroxide quantity required.

The reaction mixture is prepared using standard zeolitic preparation techniques. Sources of boron for the reaction mixture include borosilicate glasses and other reactive boron oxides. These include borates, boric acid and borate esters. Typical sources of silicon oxide include fumed silica, silicates, silica hydrogel, silicic acid, colloidal silica, tetra-alkyl orthosilicates, and silica hydroxides.

The reaction mixture is maintained at an elevated temperature until the crystals of the zeolite are formed. The temperatures during the hydrothermal crystallization step are typically maintained from about 140° C. to about 200° C., preferably from about 150° C. to about 170° C. and most preferably from about 155° C. to about 165° C. The crystallization period is typically greater than 1 day and preferably from about 3 days to about 7 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. from 8 to 24 hours, to obtain the as synthesized, SSZ-33 zeolite crystals. The drying step can be performed at atmospheric or subatmospheric pressures.

During the hydrothermal crystallization step, the SSZ-33 crystals can be allowed to nucleate spontaneously from the reaction mixture. The reaction mixture can also be seeded with SSZ-33 crystals both to direct, and accelerate the crystallization, as well as to minimize the formation of undesired borosilicate contaminants.

The synthetic SSZ-33 zeolites can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:boron mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe, and Co are particularly preferred.

The hydrogen, ammonium, and metal components can be exchanged into the zeolite. The zeolite can also be impregnated with the metals, or, the metals can be physically intimately admixed with the zeolite using standard methods known to the art. And, some metals can be occluded in the crystal lattice by having the desired metals present as ions in the reaction mixture from which the SSZ-33 zeolite is prepared.

Typical ion exchange techniques involve contacting the synthetic zeolite with a solution containing a salt of the desired replacing cation or cations. Although a wide variety of salts can be employed, chlorides and other halides, nitrates, acetates, and sulfates are particularly preferred. Representative ion exchange techniques are disclosed in a wide variety of patents including U.S. Pat. Nos. 3,140,249; 3,140,251; and 3,140,253.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The SSZ-33 borosilicate and boroaluminosilicate can be formed into a wide variety of physical shapes. Generally speaking, the zeolite can be in the form of a powder, a granule, or a molded product, such as extrudate having particle size sufficient to pass through a 2-mesh (Tyler) screen and be retained on a 400-mesh (Tyler) screen In cases where the catalyst is molded, such as by extrusion with an organic binder, the borosilicate and boroaluminosilicate can be extruded before drying, or, dried or partially dried and then extruded The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia, and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the SSZ-33 zeolites can be composited with porous matrix materials and mixtures of matrix materials such as silica, alumina, titania, magnesia, silica:alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia, and silica-magnesia-zirconia. The matrix can be in the form of a cogel.

The SSZ-33 zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix.

SSZ-33 zeolites are useful in hydrocarbon conversion reactions. Hydrocarbon conversion reactions are chemical and catalytic processes in which carbon-containing compounds are changed to different carbon-containing compounds.

Examples of hydrocarbon conversion reactions include catalytic cracking, hydrocracking, and olefin and aromatics formation reactions. The catalysts are useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., ortho xylene), and disproportionating aromatics (e.g., toluene) to provide mixtures of benzene, xylenes, and higher methylbenzenes.

The SSZ-33 catalysts have high selectivity, and under hydrocarbon conversion conditions can provide a high percentage of desired products relative to total products.

SSZ-33 zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, and in general, can be any carbon containing fluid susceptible to zeolitic catalytic reactions. Depending on the type of processing the hydrocarbonaceous feed is to undergo, the feed can contain metals or be free of metals, it can also have high or low nitrogen or sulfur impurities. It can be appreciated, however, that general processing will be more efficient (and the catalyst more active) the lower the metal, nitrogen, and sulfur content of the feedstock.

Using the SSZ-33 catalyst which contains boron and aluminum framework substitution and a hydrogenation promoter, heavy petroleum residual feedstocks, cyclic stocks, and other hydrocracking charge stocks can be hydrocracked at hydrocracking conditions including a temperature in the range of from 175° C. to 485° C., molar ratios of hydrogen to hydrocarbon charge from 1 to 100, a pressure in the range of from 0.5 to 350 bar, and a liquid hourly space velocity (LHSV) in the range of from 0.1 to 30.

Hydrocracking catalysts comprising SSZ-33 contain an effective amount of at least one hydrogenation catalyst (component) of the type commonly employed in hydrocracking catalysts. The hydrogenation component is generally selected from the group of hydrogenation catalysts consisting of one or more metals of Group VIB and Group VIII, including the salts, complexes, and solutions containing such. The hydrogenation catalyst is preferably selected from the group of metals, salts, and complexes thereof of the group consisting of at least one of platinum, palladium, rhodium, iridium, and mixtures thereof or the group consisting of at least one of nickel, molybdenum, cobalt, tungsten, titanium, chromium, and mixtures thereof. Reference to the catalytically active metal or metals is intended to encompass such metal or metals in the elemental state or in some form such as an oxide, sulfide, halide, carboxylate, and the like.

A hydrogenation component is present in the hydrocracking catalyst in an effective amount to provide the hydrogenation function of the hydrocracking catalyst and preferably in the range of from 0.05% to 25% by weight.

The SSZ-33 catalyst may be employed in conjunction with traditional hydrocracking catalysts, e.g., any aluminosilicate heretofore employed as a component in hydrocracking catalysts. Representative of the zeolitic aluminosilicates disclosed heretofore as employable as component parts of hydrocracking catalysts are Zeolite Y (including steam stabilized, e.g., ultra-stable Y), Zeolite X, Zeolite beta (U.S. Pat. No. 3,308,069), Zeolite ZK-20 (U.S. Pat. No. 3,445,727), Zeolite ZSM-3 (U.S. Pat. No. 3,415,736), faujasite, LZ-10 (U.K. Patent No. 2,014,970, June 9, 1982), ZSM-5-type zeolites, e.g., ZSM-5, ZSM-11, ZSM-12, ZSM-23, ZSM-35, ZSM-38, ZSM-48, crystalline silicates such as silicalite (U.S. Pat. No. 4,061,724), erionite, mordenite, offretite, chabazite, FU-1-type zeolite, NU-type zeolites, LZ-210-type zeolite, and mixtures thereof. Traditional hydrocracking catalysts containing amounts of $Na_2O$ less than about one percent by weight are generally preferred. The relative amounts of the SSZ-33 component and traditional hydrocracking component, if any, will depend at least in part, on the selected hydrocarbon feedstock and on the desired product distribution to be obtained therefrom, but in all instances an effective amount of SSZ-33 is employed.

The hydrocracking catalysts are typically employed with an inorganic oxide matrix component which may be any of the inorganic oxide matrix components which have been employed heretofore in the formulation of hydrocracking catalysts including: amorphous catalytic inorganic oxides, e.g., catalytically active silica-aluminas, clays, silicas, aluminas, silica-aluminas, silica-zirconias, silica-magnesias, alumina-borias, alumina-titanias, and the like and mixtures thereof. The traditional hydrocracking catalyst component (TC) and SSZ-33 may be mixed separately with the matrix component and then mixed or the TC component and SSZ-33 may be mixed and then formed with the matrix component.

SSZ-33 can be used to dewax hydrocarbonaceous feeds by selectively removing straight chain paraffins. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1,000 to about 20,000 SCF/bbl. Generally, hydrogen will be separated from the product and recycled to the reaction zone. Typical feedstocks include light gas-oil, heavy gas-oils, and reduced crudes boiling about 350° F.

The SSZ-33 hydrodewaxing catalyst may optionally contain a hydrogenation component of the type commonly employed in dewaxing catalysts. The hydrogenation component may be selected from the group of hydrogenation catalysts consisting of one or more metals of Group VIB and Group VIII, including the salts, complexes and solutions containing such metals. The preferred hydrogenation catalyst is at least one of the group of metals, salts, and complexes selected from the group consisting of at least one of platinum, palladium, rhodium, iridium, and mixtures thereof or at least one from the group consisting of nickel, molybdenum, cobalt, tungsten, titanium, chromium, and mixtures thereof. Reference to the catalytically active metal or metals is intended to encompass such metal or metals in the elemental state or in some form such as an oxide, sulfide, halide, carboxylate, and the like.

The hydrogenation component of the hydrodewaxing catalyst is present in an effective amount to provide an effective hydrodewaxing catalyst preferably in the range of from about 0.05 to 5% by weight.

SSZ-33 can be used as a reforming catalyst to convert straight run naphthas and similar mixtures to highly aromatic mixtures. Thus, normal and slightly branched chained hydrocarbons, preferably having a boiling range above about 40° C. and less than about 200° C., can be converted to products having a substantial aromatics content by contacting the hydrocarbon feed with the zeolite at a temperature in the range of from about 400° C. to 600° C., preferably 480° C.–550° C. at pressures ranging from atmospheric to 20 atmospheres, and LHSV ranging from 0.1 to 15. The hydrogen to hydrocarbon ratio will range between 1 and 10. (B)SSZ-24 can be used in a fixed, fluid, or moving bed reformer.

The reforming catalyst preferably contains a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. The most preferred metal is platinum. The amount of Group VIII metal present in the conversion catalyst should be within the normal range of use in reforming catalysts, from about 0.05 to 2.0 wt. percent, preferably 0.2 to 0.8 wt. percent. In addition, the catalyst can also contain a second Group VII metal. Especially preferred is rhenium.

The zeolite/Group VIII metal catalyst can be used without a binder or matrix. The preferred inorganic matrix, where one is used, is a silica-based binder such as Cab-O-Sil or Ludox. Other matrices such as alumina, magnesia and titania can be used. The preferred inorganic matrix is nonacidic.

It is critical to the selective production of aromatics in useful quantities that the conversion catalyst be substantially free of acidity, for example, by poisoning the zeolite with a basic metal, e.g., alkali metal, compound. The zeolite is usually prepared from mixtures containing alkali metal hydroxides and thus, have alkali metal contents of about 1–2 wt. %. These high levels of alkali metal, usually sodium or potassium, are unacceptable for most other catalytic applications because they greatly deactivate the catalyst for cracking reactions by reducing catalyst acidity. Therefore, the alkali metal is removed to low levels by ion exchange with hydrogen or ammonium ions. By alkali metal compound as used herein is meant elemental or ionic alkali metals or their basic compounds. Surprisingly, unless the zeolite itself is substantially free of acidity, the alkali metal is required in the present process to reduce acidity and improve aromatics production.

The amount of alkali metal necessary to render the zeolite substantially free of acidity can be calculated using standard techniques based on the aluminum, gallium or iron content of the zeolite. If a zeolite free of alkali metal is the starting material, alkali metal ions can be ion exchanged into the zeolite to substantially eliminate the acidity of the zeolite. An alkali metal content of about 100%, or greater, of the acid sites calculated on a molar basis is sufficient.

Where the basic metal content is less than 100% of the acid sites on a molar basis, the test described in U.S. Pat. No. 4,347,394 which patent is incorporated totally herein by reference, can be used to determine if the zeolite is substantially free of acidity.

The preferred alkali metals are sodium, potassium, and cesium as well as other Groups IA and IIA metals. The zeolite itself can be substantially free of acidity only at very high silica:alumina mole ratios; by "zeolite consisting essentially of silica" is meant a zeolite which is substantially free of acidity without base poisoning.

We have also found that SSZ-33 is advantageously used to catalytically crack hydrocarbon feedstocks in the absence of hydrogen. Preferred conditions involve a fluidized catalytic cracking process which consists of contacting a hydrocarbon feedstock with a catalyst in a reaction zone in the absence of added hydrogen at average catalyst temperatures ranging from 800° F. to 1500° F., separating the catalyst from the product effluent, introducing the catalyst into a steam-stripping zone, and subsequently into a regeneration zone in the presence of steam and free oxygen containing gas where reaction coke deposited on the catalyst is burned off at elevated temperatures ranging from 1000° F. to 1550° F., and then recycling the reactivated catalyst to the reaction zone.

For this purpose, the SSZ-33 can be employed in conjunction with traditional cracking catalysts either as an incorporated constituent component or as a separate additive particle.

The catalyst may be employed in conjunction with traditional cracking catalysts, comprising any aluminosilicate heretofore employed as a component in cracking catalysts. Representative of the zeolitic aluminosilicates disclosed heretofore as employable as component parts of cracking catalysts are Zeolite Y (including steam stabilized Y, rare earth Y, chemically modified Y, ultra-stable Y or combinations thereof), Zeolite X, Zeolite beta (U.S. Pat. No. 3,308,069), Zeolite ZK-20 (U.S. Pat. No. 3,445,727), Zeolite ZSM-3 (U.S. Pat. No. 3,415,736), faujasite, LZ-10 (U.K. Patent No. 2,014,970, June 9, 1982), ZSM-5-Type Zeolites, e.g., ZSM-5, ZSM-11, ZSM-12, ZSM-23, ZSM-35, ZSM-38, ZSM-48, crystalline silicates such as silicalite (U.S. Pat. No. 4,061,724), erionite, mordenite, offretite, chabazite, FU-1-type zeolite, NU-type zeolite, LZY-210 type zeolite or other dealuminated zeolite of 24.5 Å unit cell size or lower, or zeolite grown "in-situ" in matrix materials (U.S. Pat. Nos. 3,647,718 and 4,493,902), and the mixtures thereof. The term "zeolite" as used herein contemplates not only aluminosilicates but substances in which the aluminum is replaced by gallium or boron and substances in which silicon is replaced by germanium. Other representative acidic aluminosilicates also deemed employable as component parts are amorphous silica-alumina catalysts, synthetic mica-montmorillonite catalysts (as defined in U.S. Pat. No. 3,252,889), cross-linked or pillared clays (as defined in U.S. Pat. Nos. 4,176,090; 4,248,739; 4,238,364 and 4,216,188), and acid activated clays—bentonite, hectorite, saponite.

Traditional cracking catalysts containing amounts of $Na_2O$ less than about one percent by weight are generally preferred. The relative amounts of the SSZ-33 component and traditional cracking component (TC), if any, will depend at least in part, on the selected hydrocarbon feedstock and on the desired product distribution to be obtained therefrom, but in all instances, an effective amount of SSZ-33 is employed. When a TC component is employed, the relative weight ratio of the TC to the SSZ-33 is generally between about 1:10 and about 500:1, desirably between about 1:10 and about 200:1, preferably between about 1:2 and about 50:1, and most preferably is between about 1:1 and about 20:1.

The cracking catalysts are typically employed with an inorganic oxide matrix component which may be any of the inorganic oxide matrix components which have been employed heretofore in the formulation of FCC catalysts including: amorphous catalytic inorganic oxides, e.g., catalytically active silica-aluminas, clays, synthetic or acid activated clays, silicas, aluminas, silica-aluminas, silica-zirconias, silica-magnesias, alumina-borias, alumina-titanias, pillared or cross-linked clays, and the like and mixtures thereof. The TC component and SSZ-33 may be mixed separately with their matrix component and then mixed together or the TC component and SSZ-33 may be mixed together and then formed with the matrix component.

The mixture of a traditional cracking catalyst and SSZ-33 may be carried out in any manner which results in the coincident presence of such in contact with the crude oil feedstock under catalytic cracking conditions. For example, a catalyst may be employed containing traditional cracking catalyst component and SSZ-33 in single catalyst particles or SSZ-33 with or without a matrix component may be added as a discrete component to a traditional cracking catalyst provided its particle has appropriate density and particle size distribution.

SSZ-33 can also be used to oligomerize straight and branched chain olefins having from about 2-21 and preferably 2-5 carbon atoms. The oligomers which are the products of the process are medium to heavy olefins which are useful for both fuels, i.e., gasoline or a gasoline blending stock and chemicals.

The oligomerization process comprises contacting the olefin feedstock in the gaseous state phase with SSZ-33 at a temperature of from about 450° F. to about 1200° F., a WHSV of from about 0.2 to about 50 and a hydrocarbon partial pressure of from about 0.1 to about 50 atmospheres.

Also, temperatures below about 450° F. may be used to oligomerize the feedstock, when the feedstock is in the liquid phase when contacting the zeolite catalyst. Thus, when the olefin feedstock contacts the zeolite catalyst in the liquid phase, temperatures of from about 50° F. to about 450° F., and preferably from 80°-400° F. may be used and a WHSV of from about 0.05 to 20 and preferably 0.1 to 10. It will be appreciated that the pressures employed must be sufficient to maintain the system in the liquid phase. As is known in the art, the pressure will be a function of the number of carbon atoms of the feed olefin and the temperature. Suitable pressures include from about 0 psig to about 3000 psig.

The zeolite used in the oligomerization process can have the original cations associated therewith replaced by a wide variety of other cations according to techniques well known in the art. Typical cations would include hydrogen, ammonium, and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. One of the prime requisites is that the zeolite have a fairly low aromatization activity, i.e., in which the amount of aromatics produced is not more than about 20 percent by weight. This is accomplished by using a zeolite with controlled acid activity [alpha value] of from about 0.1 to about 120, preferably from about 0.1 to about 100, as measured by its ability to crack n-hexane.

Alpha values are defined by a standard test known in the art, e.g., as shown in U.S. Pat. No. 3,960,978 which is incorporated herein by reference. If required, such zeolites be obtained by steaming, by use in a conversion process or by any other method which may occur to one skilled in this art.

SSZ-33 can be used to convert light gas $C_2$–$C_6$ paraffins and/or olefins to higher molecular weight hydrocarbons including aromatic compounds. Operating temperatures of 100°–700° C., operating pressures of 0–1000 psig and space velocities of 0.5–40 $hr^{-1}$ WHSV can be used to convert the $C_2$–$C_6$ paraffin and/or olefins to aromatic compounds. Preferably, the zeolite will contain a catalyst metal or metal oxide wherein said metal is selected from the group consisting of Group IB, IIB, VIII, and IIIA of the Periodic Table, and most preferably, gallium or zinc and in the range of from about 0.05–5 percent by weight.

SSZ-33 can be used to condense lower aliphatic alcohols having 1-10 carbon atoms to a gasoline boiling point hydrocarbon product comprising mixed aliphatic and aromatic hydrocarbon. Preferred condensation reaction conditions using SSZ-33 as the condensation catalyst include a temperature of about 500° to 1000° F., a pressure of about 0.5 to 1000 psig and a space velocity of about 0.5 to 50 WHSV. U.S. Pat. No. 3,984,107 describes the condensation process conditions in more detail. The disclosure of U.S. Pat. No. 3,984,107 is incorporated herein by reference.

The SSZ-33 catalyst may be in the hydrogen form or may be base exchanged or impregnated to contain amonium or a metal cation complement, preferably in the range of from about 0.05 to 5 percent by weight. The metal cations that may be present include any of the metals of the Groups I-VIII of the Periodic Table. However, in the case of Group IA metals, the cation content should in no case be so large as to effectively inactivate the catalyst.

The SSZ-33 catalyst is highly active and highly selective for isomerizing $C_4$ to $C_7$ hydrocarbons. The activity means that the catalyst can operate at relatively low temperatures which thermodynamically favors highly branched paraffins. Consequently, the catalyst can produce a high octane product. The high selectivity means that a relatively high liquid yield can be achieved when the catalyst is run at a high octane.

The isomerization process comprises contacting the isomerization catalyst with a hydrocarbon feed under isomerization conditions. The feed is preferably a light straight run fraction, boiling within the range of 30°–250° F. and preferably from 60°–200° F. Preferably, the hydrocarbon feed for the process comprises a substantial amount of $C_4$ to $C_7$ normal and slightly branched low octane hydrocarbons, more preferably $C_5$ and $C_6$ hydrocarbons.

The pressure in the process is preferably between 50-1000 psig, more preferably between 100-500 psig. The LHSV is preferably between about 1 to about 10 with a value in the range of about 1 to about 4 being more preferred. It is also preferable to carry out the isomerization reaction in the presence of hydrogen.

Preferably, hydrogen is added to give a hydrogen to hydrocarbon ratio ($H_2$/HC) of between 0.5 and 10 $H_2$/HC, more preferably between 1 and 8 $H_2$/HC. The temperature is preferably between about 200° F. and about 1000° F., more preferably between 400°–600° F. As is well known to those skilled in the isomerization art, the initial selection of the temperature within this broad range is made primarily as a function of the desired conversion level considering the characteristics of the feed and of the catalyst. Thereafter, to provide a relatively constant value for conversion, the temperature may have to be slowly increased during the run to compensate for any deactivation that occurs.

A low sulfur feed is especially preferred in the isomerization process. The feed preferably contains less than 10 ppm, more preferably less than 1 ppm, and most preferably less than 0.1 ppm sulfur. In the case of a feed which is not already low in sulfur, acceptable levels can be reached by hydrogenating the feed in a presaturation zone with a hydrogenating catalyst which is resistant to sulfur poisoning. An example of a suitable catalyst for this hydrodesulfurization process is an alumina-containing support and a minor catalytic proportion of molybdenum oxide, cobalt oxide and/or nickel oxide. A platinum on alumina hydrogenating catalyst can also work. In which case, a sulfur sorber is preferably placed downstream of the hydrogenating catalyst, but upstream of the present isomerization catalyst. Examples of sulfur sorbers are alkali or alkaline earth metals on porous refractory inorganic oxides, zinc, etc. Hydrodesulfurization is typically conducted at 315°–455° C., at 200–2000 psig, and at a LHSV of 1–5.

It is preferable to limit the nitrogen level and the water content of the feed. Catalysts and processes which are suitable for these purposes are known to those skilled in the art.

After a period of operation, the catalyst can become deactivated by coke. Coke can be removed by contacting the catalyst with an oxygen-containing gas at an elevated temperature.

The isomerization catalyst preferably contains a Group VIII metal compound to have sufficient activity for commercial use. By Group VIII metal compound as used herein is meant the metal itself or a compound thereof. The Group VIII noble metals and their compounds, platinum, palladium, and iridium, or combinations thereof can be used. Rhenium and tin may also be used in conjunction with the noble metal. The most preferred metal is platinum. The amount of Group VIII metal present in the conversion catalyst should be within the normal range of use in isomerizing catalysts, from about 0.05–2.0 wt. %.

SSZ-33 can be used in a process for the alkylation or transalkylation of an aromatic hydrocarbon. The process comprises contacting the aromatic hydrocarbon with a $C_2$ to $C_{20}$ olefin alkylating agent or a polyalkyl aromatic hydrocarbon transalkylating agent, under at least partial liquid phase conditions, and in the presence of a catalyst comprising SSZ-33.

For high catalytic activity, the SSZ-33 zeolite should be predominantly in its hydrogen ion form. Generally, the zeolite is converted to its hydrogen form by ammonium exchange followed by calcination. If the zeolite is synthesized with a high enough ratio of organonitrogen cation to sodium ion, calcination alone may be sufficient. It is preferred that, after calcination, at least 80% of the cation sites are occupied by hydrogen ions and/or rare earth ions.

The pure SSZ-33 zeolite may be used as a catalyst, but generally, it is preferred to mix the zeolite powder with an inorganic oxide binder such as alumina, silica, silica/alumina, or naturally occurring clays and form the mixture into tablets or extrudates. The final catalyst may contain from 1–99 wt. % SSZ-33 zeolite. Usually the zeolite content will range form 10–90 wt. %, and more typically from 60–80 wt. %. The preferred inorganic binder is alumina. The mixture may be formed into tablets or extrudates having the desired shape by methods well known in the art.

Examples of suitable aromatic hydrocarbon feedstocks which may be alkylated or transalkylated by the process of the invention include aromatic compounds such as benzene, toluene, and xylene. The preferred aromatic hydrocarbon is benzene. Mixtures of aromatic hydrocarbons may also be employed.

Suitable olefins for the alkylation of the aromatic hydrocarbon are those containing 2–20 carbon atoms, such as ethylene, propylene, butene-1, transbutene-2, and cis-butene-2, and higher olefins, or mixtures thereof. The preferred olefin is propylene. These olefins may be present in admixture with the corresponding $C_2$ to $C_{20}$ paraffins, but it is preferable to remove any dienes, acetylenes, sulfur compounds or nitrogen compounds which may be present in the olefin feedstock stream to prevent rapid catalyst deactivation.

When transalkylation is desired, the transalkylating agent is a polyalkyl aromatic hydrocarbon containing two or more alkyl groups that each may have from two to about four carbon atoms. For example, suitable polyalkyl aromatic hydrocarbons include di-, tri-, and tetra-alkyl aromatic hydrocarbons, such as diethylbenzene, triethylbenzene, diethylmethylbenzene (diethyl-toluene), di-isopropylbenzene, di-isopropyltoluene, dibutylbenzene, and the like. Preferred polyalkyl aromatic hydrocarbons are the dialkyl benzenes. A particularly preferred polyalkyl aromatic hydrocarbon is di-isopropylbenzene.

Reaction products which may be obtained include ethylbenzene from the reaction of benzene with either ethylene or polyethylbenzenes, cumene from the reaction of benzene with propylene or polyisopropylbenzenes, ethyltoluene from the reaction of toluene with ethylene or polyethyltoluenes, cymenes from the reaction of toluene with propylene or polyisopropyltoluenes, and secbutylbenzene from the reaction of benzene and n-butenes or polybutylbenzenes. The production of cumene from the alkylation of benzene with propylene or the transalkylation of benzene with di-isopropylbenzene is especially preferred.

When alkylation is the process conducted, reaction conditions are as follows. The aromatic hydrocarbon feed should be present in stoichiometric excess. It is preferred that molar ratio of aromatics to olefins be greater than four-to-one to prevent rapid catalyst fouling. The reaction temperature may range from 100°–600° F., preferably, 250°–450° F. The reaction pressure should be sufficient to maintain at least a partial liquid phase in order to retard catalyst fouling. This is typically 50–1000 psig depending on the feedstock and reaction temperature. Contact time may range from 10 seconds to 10 hours, but is usually from five minutes to an hour. The WHSV in terms of grams (pounds) of aromatic hydrocarbon and olefin per gram (pound) of catalyst per hour, is generally within the range of about 0.5 to 50.

When transalkylation is the process conducted, the molar ratio of aromatic hydrocarbon will generally range from about 1:1 to 25:1, and preferably from about 2:1 to 20:1. The reaction temperature may range from about 100°–600° F., but it is preferably about 250°–450° F. The reaction pressure should be sufficient to maintain at least a partial liquid phase, typically in the range of about 50–1000 psig, preferably 300–600 psig The WHSV will range from about 0.1–10.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., platinum, include hydrogenation-dehydrogenation reactions, denitrogenation, and desulfurization reactions.

Some hydrocarbon conversions can be carried out on SSZ-33 zeolites utilizing the large pore shape-selective behavior. For example, the substituted SSZ-33 zeolite may be used in preparing cumene or other alkylbenzenes in processes utilizing propylene to alkylate aromatics.

SSZ-33 can be used in hydrocarbon conversion reactions with active or inactive supports, with organic or inorganic binders, and with and without added metals. These reactions are well known to the art, as are the reaction conditions.

SSZ-33 can also be used as an adsorbent, as a filler in paper, paint, and toothpastes, and as a water-softening agent in detergents.

The following examples illustrate the preparation of SSZ-33.

EXAMPLES

EXAMPLE 1

Preparation of N,N,N-Trimethyl-8-Ammonium Tricyclo[5.2.1.0$^{2,6}$]decane Hydroxide (Template)

Five grams of 8-keto-tricyclo[5.2.1.0$^{2,6}$]decane (Aldrich Chemical Company) was mixed with 2.63 g of formic acid (88%) and 4.5 g of dimethyl formamide. The mixture was then heated in a pressure vessel for 16 hours at 190° C. Care should be taken to anticipate the increase in pressure the reaction experiences due to $CO_2$ evolution. The reaction was conveniently carried out in a Parr 4748 reactor with Teflon liner. The workup consists of extracting N,N dimethyl-8-amino tricyclo[5.2.1.0$^{2,6}$]decane from a basic (pH=12) aqueous solution with diethyl ether. The various extracts were dried with $Na_2SO_4$, the solvent removed, and the product taken up in ethyl acetate. An excess of methyl iodide was added to a cooled solution which was then stirred at room temperature for several days. The crystals were collected and washed with diethyl ether to give N,N,N Trimethyl-8-ammonium tricyclo[5.2.10,6]decane iodide. The product has a melting point of 270°–72° C. and the elemental analyses and NMR are consistent with the known structure. The vacuum-dried iodide salt was then ion-exchanged with ion-exchange resin AG 1X8 (in molar excess) to the hydroxide form. The exchange was performed over a column or more preferably, by overnight stirring of the resin beads and the iodide salt in an aqueous solution designed to give about a 0.5 molar solution of the organic hydroxide.

EXAMPLE 2

3.62 g of a 0.62M solution of the template from Example 1 is diluted with 8.36 mL $H_2O$. 0.08 g of NaOH(solid) and 0.06 g of $Na_2B_4O_7.18H_2O$ are dissolved in this solution and then 0.90 g of Cab-O-Sil are blended in last. The reaction mixture is heated in a Parr 4745 reactor at 160° C. and rotated at 30 rpm on a spit in a Blue M oven over a six-day period. The solid component of the reaction is filtered, washed repeatedly, dried at 115° C., and analyzed by X-ray diffraction. The product is identified as SSZ-33. The pattern is tabulated in Table 2.

EXAMPLE 3

The same experiment is set up as in Example 2 except the boron content is increased by adding 0.105 g of $Na_2B_4O_7.18H_2O$. This produces a $SiO_2/B_2O_3$ ratio of 30 in this experiment as compared with a value of 50 in Example 2.

The experiment is run under analogous conditions although this time the crystallization is not complete in 6 days, requiring a total of 10 days. The product is SSZ-33 by XRD with a small amount of Kenyaiite-like impurity.

EXAMPLE 4

Forty-eight grams of 0.69 M solution of the template from Example 1 is mixed with 132 g of $H_2O$, 1.35 g of NaOH(solid), and 0.96 g of $Na_2B_4O_7.18H_2O$. 13.5 g of Cab-O-Sil is blended in last and the reaction is run in a Parr 300-cc stirred autoclave for six days at 160° C. and stirred at 50 rpm. The product is well-crystallized SSZ-33.

TABLE 2

| 2θ | d/n | Int. |
|---|---|---|
| 7.86 | 11.25 | 90 |
| 8.36 | 10.58 | 2 |
| 14.21 | 6.23 | 13 |
| 15.76 | 5.62 | 7 |
| 16.77 | 5.29 | 10 |
| 20.48 | 4.336 | 100 |
| 21.47 | 4.139 | 40 |
| 22.03 | 4.035 | 90 |
| 23.18 | 3.837 | 64 |
| 25.26 | 3.526 | 13 |
| 26.83 | 3.323 | 40 |
| 28.65 | 3.116 | 12 |
| 29.18 | 3.060 | 10 |
| 30.62 | 2.920 | 8 |

EXAMPLE 5

Another run is made on twice the scale used in Example 4 and utilizing an autoclave of 600-cc capacity. The product was once again a well-crystallized sample of SSZ-33 and the X-ray diffraction data is given in Table 3.

TABLE 3

| 2θ | d/n | Int. | 100 × I/I$_o$ |
|---|---|---|---|
| 7.83 | 11.29 | 50 | 83 |
| 8.34 | 10.60 | 2 | 3 |
| 14.20 | 6.24 | 7 | 12 |
| 15.72 | 5.637 | 5 | 8 |
| 16.74 | 5.296 | 5 | 8 |
| 20.49 | 4.334 | 60 | 100 |
| 21.49 | 4.135 | 20 | 33 |
| 22.04 | 4.033 | 50 | 83 |
| 22.98 | 3.870 | 15 Sh | 25 Sh |
| 23.16 | 3.840 | 30 | 50 |
| 25.28 | 3.523 | 7 | 12 |

TABLE 3-continued

| 2θ | d/n | Int. | 100 × I/I₀ |
|---|---|---|---|
| 25.47 | 3.497 | 3 Sh | 5 Sh |
| 26.61 | 3.350 | 11 | 18 |
| 26.87 | 3.318 | 23 | 38 |
| 28.67 | 3.114 | 9 | 15 |
| 29.20 | 3.058 | 5 | 8 |
| 30.63 | 2.919 | 4 | 7 |
| 31.84 | 2.810 | 4 | 7 |
| 32.30 | 2.772 | 3 | 5 |
| 33.47 | 2.677 | 4 | 7 |
| 33.91 | 2.644 | 1 | 2 |
| 35.76 | 2.511 | 3 | 5 |
| 36.15 | 2.485 | 3 | 5 |
| 36.58 | 2.456 | 3 | 5 |
| 37.21 | 2.416 | 5 | 8 |
| 37.52 | 2.397 | 2 | 3 |

EXAMPLE 6

The product of Example 5 was calcined as follows. The sample was heated in a muffle furnace from room temperature up to 540° C. at a steadily increasing rate over a seven-hour period. The sample was maintained at 540° C. for four more hours and then taken up to 600° C. for an additional four hours. Nitrogen was passed over the zeolite at a rate of 20 standard cubic feet per minute during heating. The calcined product had the X-ray diffraction lines indicated in Table 4 below.

TABLE 4

| 2θ | d/n | Int. | 100 × I/I₀ |
|---|---|---|---|
| 7.81 | 11.32 | 175 | 100 |
| 8.33 | 10.61 | 8 | 5 |
| 13.28 | 6.67 | 11 | 6 |
| 14.18 | 6.25 | 11 | 6 |
| 15.71 | 5.641 | 3 | 2 |
| 16.73 | 5.299 | 9 | 5 |
| 20.43 | 4.347 | 80 | 46 |
| 20.76 | 4.279 | 4 | 2 |
| 21.44 | 4.144 | 15 | 9 |
| 22.02 | 4.037 | 72 | 41 |
| 23.00 | 3.867 | 24 Sh | 14 Sh |
| 23.18 | 3.837 | 49 | 28 |
| 23.67 | 3.759 | 2 | 1 |
| 25.27 | 3.524 | 14 | 8 |
| 25.46 | 3.498 | 6 Sh | 3 Sh |
| 26.57 | 3.355 | 33 | 19 |
| 26.80 | 3.326 | 54 | 31 |
| 28.68 | 3.113 | 13 | 7 |
| 29.18 | 3.060 | 13 | 7 |
| 30.66 | 2.916 | 9 | 5 |
| 31.81 | 2.813 | 8 | 5 |
| 32.31 | 2.771 | 4 | 2 |
| 33.51 | 2.674 | 9 | 5 |
| 33.95 | 2.640 | 2 | 1 |
| 35.74 | 2.512 | 7 | 4 |
| 36.11 | 2.487 | 5 | 3 |
| 36.60 | 2.455 | 5 | 3 |
| 37.21 | 2.416 | 8 | 5 |
| 37.60 | 2.392 | 4 | 2 |

EXAMPLE 7

Ion-exchange of the calcined material from Example 6 was carried out using NH₄NO₃ to convert the zeolites from Na form to HH₄ and then eventually H form. Typically the same mass of NH₄NO₃ as zeolite was slurried into H₂O at ratio of 50/1 H₂O/zeolite. The exchange solution was heated at 100° C. for two hours and then filtered. This process was repeated four times. Finally, after the last exchange, the zeolite was washed several times with H₂O and dried. A repeat calcination as in Example 5 was carried out, but without the final treatment at 600° C. This produces the H form of the zeolites. The surface area for this material was 520 m²/g. The micro pore volume was 0.21 cc/g as determined by BET method with N₂ as absorbate.

EXAMPLE 8

Constraint Index Determination 0.50 g of the hydrogen form of the zeolite of Example 4 (after treatment according to Examples 6 and 7 was packed into a ⅜-in. stainless steel tube with alundum on both sides of the zeolite bed. A Lindburg furnace was used to heat the reactor tube. Helium was introduced into the reactor tube at 10 cc/minute and atmospheric pressure. The reactor was take to 250° F. for 40 minutes and then raised to 800° F. Once temperature equilibration was achieved, a 50/50, w/w feed of n-hexane, and 3-methylpentane was introduced into the reactor at a rate of 0.62 cc/hour. Feed delivery was made via syringe pump. Direct sampling onto a gas chromatograph was begun after 10 minutes of feed introduction. Constraint Index values were calculated from gas chromatographic data using methods known in the art.

| Example No. | Constraint Index | Conversion at 10 Min. | Temp., °F |
|---|---|---|---|
| 8 | — | 0 | 800 |

EXAMPLE 9

SSZ-33 was prepared as in Example 4 and treated as in Examples 6 and 7. The zeolite is refluxed overnight with Al(NO₃)₃.9H₂O with the latter being one-half the mass of the zeolite and using the same dilution as in the ion-exchange of Example 7. The product is filtered, washed, and calcined to 540° C. After pelletizing the zeolite powder and retaining the 20–40 mesh fraction from breaking up the pellet, the catalyst is tested as in Example 8. Data for the reaction is given in Table 5 along with a variety of catalysts made from analogous treatments with other metal salts.

TABLE 5

Constraint Index Determination For Metal-Treated SSZ-33

| Example No. | Metal Salt | Constraint Index | Conversion, % (10 Min.) | Temp., °F |
|---|---|---|---|---|
| 8 | None | — | 0 | 800 |
| 9 | Al(NO₃)₃ | 0.6 | 62 | 800 |
| 10 | Ga(NO₃)₃ | 0.4 | 55 | 800 |
| 11 | Cr(NO₃)₃ | 0.3 | 1 | 800 |
| 12 | Fe(NO₃)₃ | 0.3 | 1 | 800 |
| 13 | Zn(AC)₂ | 0.7 | 5 | 800 |

EXAMPLE 14

The zinc version of SSZ-33 was evaluated as a reforming catalyst. 19 gms of SZ-33 zeolite was ion-exchanged with 4.5 gms of Zn(AC)₂.2H₂O and then washed, dried, and calcined to 540° C. The zeolie powder was impregnated with Pt(NH₃)₄.2NO₃ to give 0.8 wt. % Pt. The material was calcined up to 550° F. in air and maintained at this temperature for three hours. The powder was pelletized on a Carver press at 1000 psi and broken and meshed to 24–40.

The catalyst was evaluated at 900° F. in hydrogen uder the following conditions:

| psig = | 200 |
|---|---|

-continued

| | |
|---|---|
| $H_2/HC =$ | 6.4 |
| WHSV = | 6 |
| Temperature = | 900° F. |

The feed was an $iC_7$ mixture (Philips Petroleum Company).

The catalyst is very stable and data averaged over 20-63 hours is given in Table 6.

TABLE 6

| | Feed | Product, % |
|---|---|---|
| Conversion, % | | 71.1 |
| Toluene | 0.52 | 28 |
| $C_5$-$C_8$ Octane | 63.7 | 85 |
| Aromatization Selectivity | | 44.5 |
| Toluene in $C_5+$ Aromatics, % | | 88.5 |
| Aromatics in $C_5+$ Product, % | | 42.5 |

EXAMPLE 15

A reaction is set up and run as in Example 2 except that an equivalent amount of silica derived from Ludox AS-30 sol replaces Cabosil M5. The product is once again SZ-33 with just a trace of Quartz.

EXAMPLE 16

A product was prepared as in Example 15 followed by treatments given in Examples 6 and 7. Next, the catalyst was ion-exchanged with an aqueous solution of Pd $(NH_3)_4.2NO_3$ (pH adjusted to 10 with $NH_4OH$) to give a maximum of 0.5 wt. % loading of palladium. The catalyst was then calcined slowly, up to 900° F. in air and held there for three hours. Table 7 gives run conditions and product data for the hydrocracking of n-hexadecane. The catalyst is quite stable at the temperatures given.

TABLE 7

| | | |
|---|---|---|
| Temperature, °F. | 640 | 655 |
| WHSV | 1.55 | 1.55 |
| psig | 1200 | 1200 |
| Conversion | 95.9 | 99.8 |
| Isom. Select. | 49 | 22.4 |
| Crack. Select. | 51 | 77.7 |
| $C_5+/C_4$ | 10.0 | 9.3 |
| $C_5+C_6/C_5+$ | 20.8 | 22.4 |

The data shows that the catalyst has good isomerization selectivity.

EXAMPLE 17

The hydrogen form of SSZ-33 can be used in typical fluidized catalytic cracking. For such purposes, the catalyst prepared as in Examples 17, 18, 19 and 20 was tested in a micro-activity test (MAT) with subsequent gas chromatographic analysis of the liquid product to determine calculated octanes. MAT testing was conducted at 32 WHSV, 3 cat/oil ratio, 960° F. initial cat temperature and with a total catalyst charge of 4 gms. The FCC catalytic octane additive formulated for Examples 17, 18, 19 and 20 contained 25% by weight SSZ-33, 31.5% Kaolin, and a 43.5% silica/alumina matrix. MAT tests were run with fresh FCC catalytic octane additive as well as with the additive steamed at 1350° F. for five hours. The catalyst inventory contained 90% by weight of a rare earth equilibrium catalyst plus either the steamed or fresh FCC catalytic octane additive. The reference used in the MAT for both the fresh and steamed MAT cases is inventory containing 100% rare earth equilibrium catalyst. Table 8 shows inspection of the feed and resulting conversions and computed octanes.

TABLE 8

MAT Test for SSZ-33 Zeolite

| Feed: | |
|---|---|
| API | 24.3 |
| Aniline pt, °F. | 185.8 |
| Ramsbottom Carbon, wt. % | 0.17 |
| N(T), ppm | 1000 |
| N(B), ppm | 210 |
| S(T), wt. % | 0.33 |
| Simulated Distillation | |
| ST | 240° C. |
| 5 Vol % | 342° C. |
| 10 Vol % | 373° C. |
| 30 Vol % | 424° C. |
| 50 Vol % | 467° C. |
| 70 Vol % | 516° C. |
| 90 Vol % | 592° C. |
| 95 Vol % | 623° C. |
| EP | 680° C. |

| | Reference Catalyst | 90% Reference Catalyst, Plus | |
|---|---|---|---|
| | | Fresh Additive | Steamed Additive |
| Test Data: | | | |
| Conversion, wt. % | 57 | 64.0 | 58.0 |
| $C_5$-430° F. | 43 | 45.0 | 43.0 |
| Gasoline + Alkylate | 49 | 54.0 | 50.0 |
| Relative Gas Make To Reference Run: | | | |
| $C_3/C_3$ REF | 1.0 | 1.4 | 1.2 |
| $C_4/C_4$ REF | 1.0 | 1.4 | 1.2 |
| $C_5$-250 | | | |
| RON | 78.7 | 81.0 | 80.5 |
| MON | 73.1 | 74.1 | 73.9 |
| $C_5$-340 | | | |
| RON | 77.5 | 80.0 | 79.1 |
| MON | 71.0 | 72.6 | 72.0 |

EXAMPLE 18

The hydrogen form of SSZ-33 can be used in catalytic cracking. The catalyst as prepared in Examples 17, 18, 19 and 20 was tested in fixed fluidized cyclic tests. The tests were run on fresh additive and on additive steamed at 1350° F. for five hours. Fixed fluidized cyclic testing was conducted at 7 cat/oil ratio, with a 1100° F. initial catalyst temperature. A subsequent gas chromatographic analysis of the liquid product was made to determine calculated octanes. The same rare earth equilibrium catalyst used in Example 17 was used in this example for the reference catalyst; a 10% FCC catalytic octane additive level was also used in this example. Feed properties were the same as in Example 17.

Table 9 shows the computed research octane number and the computed motor octane number.

TABLE 9

Fixed Fluidized Cyclic Test

| | Reference Catalyst | 90% Reference Catalyst, Plus | |
|---|---|---|---|
| | | Fresh Additive | Steamed Additive |
| $C_5$-250 | | | |

TABLE 9-continued

| | Fixed Fluidized Cyclic Test | | |
|---|---|---|---|
| | | | 90% Reference Catalyst, Plus |
| | Reference Catalyst | Fresh Additive | Steamed Additive |
| RON | 87.0 | 88.9 | 87.8 |
| MON | 76.7 | 77.2 | 76.8 |
| C$_5$-340 | | | |
| RON | 85.3 | 86.9 | 86.0 |
| MON | 75.5 | 76.2 | 75.8 |

EXAMPLE 19

The hydrogen form of SSZ-33 can be added to the FCC inventory. As demonstrated by the fixed fluidized cycling test results on Table 11, the octane enhancement for a SSZ-33-derived additive does not seem to be adversely affected by the presence of high nitrogen in the feedstream. The tests were run with the catalyst inventory containing 10% by weight fresh SSZ-33 FCC catalytic octane additive and 90% steamed rare earth FCC cracking catalyst. The SSZ-33 FCC catalytic octane additive is described in Example 17 and fixed fluidized cyclic testing conditions are described in Example 18. High and low nitrogen feedstreams were used to demonstrate the effectiveness of SSZ-33. Feed properties of the high and low nitrogen feedstreams are given in Table 10. Reference fixed fluidized cyclic tests does not contain an SSZ-33 additive. Increment octane enhancement due to the presence of SSZ-33 was observed irrespective of nitrogen level.

TABLE 10

| | Low Nitrogen Feed | High Nitrogen Feed |
|---|---|---|
| Feed: | | |
| API | 27.4 | 23.3 |
| Aniline pt, °F | 187.3 | 173.1 |
| N(T), ppm | 1040 | 2700 |
| N(B), ppm | 244 | 926 |
| Simulated Distillation | | |
| ST | 160° C. | 189° C. |
| 5 Vol % | 256° C. | 287° C. |
| 10 Vol % | 287° C. | 329° C. |
| 30 Vol % | 362° C. | 389° C. |
| 50 Vol % | 430° C. | 431° C. |
| 70 Vol % | 499° C. | 467° C. |
| 90 Vol % | 595° C. | 520° C. |
| 95 Vol % | 630° C. | 552° C. |
| EP | 654° C. | 600° C. |

TABLE 11

| | Reference Catalyst | | 90% Reference Catalyst, Plus Additive | |
|---|---|---|---|---|
| | 1040 ppm Nitrogen Feed | 2700 ppm Nitrogen Feed | 1040 ppm Nitrogen Feed | 2700 ppm Nitrogen Feed |
| C$_5$-250 | | | | |
| RON | 86.4 | 86.3 | 88.3 | 87.8 |
| MON | 76.2 | 76.0 | 76.8 | 76.5 |
| C$_5$-340 | | | | |
| RON | 85.5 | 85.3 | 87.5 | 87.6 |
| MON | 75.7 | 75.6 | 76.8 | 76.9 |

EXAMPLE 20

The hydrogen form of SSZ-33 can be used in typical fluidized catalytic cracking. For such purposes, the FCC catalytic octane additive detailed in Example 17 was tested with a non-rare earth FCC catalyst to demonstrate that SSZ-33 based catalytic octane additives can be used with both rare earth and non-rare earth FCC catalysts. The SSZ-33 FCC catalytic octane additive is detailed in Example 17 while fixed fluidized cyclic testing conditions are described in Example 18. Reference does not contain any FCC catalytic octane additive; low nitrogen feed of Example 19 is used as the test feed. Table 12 shows calculated liquid product research and motor octanes.

TABLE 12

| | Reference Catalyst | 90% Reference Catalyst, Plus Fresh Catalyst |
|---|---|---|
| C$_5$-250 | | |
| RON | 90.8 | 91.2 |
| MON | 77.3 | 77.8 |
| C$_5$-340 | | |
| RON | 88.1 | 89.9 |
| MON | 76.4 | 78.0 |

What is claimed is:

1. A zeolite having a mole ratio, of an oxide selected from silicon oxide, germanium oxide, and mixtures thereof to an oxide selected from boron oxide or mixtures of boron oxide with aluminum oxide, gallium oxide, or iron oxide, greater than about 20:1, and wherein the amount of boron in the zeolite is greater than 100 parts per million, and having the X-ray diffraction lines of Table 1(a).

2. A zeolite in accordance with claim 1 having a mole ratio of an oxide selected from silicon oxide, germanium oxide, and mixtures thereof to a boron oxide, greater than about 20:1.

3. A zeolite in accordance with claim 1 wherein the amount of boron is between 1% by weight and 0.05% by weight.

4. A zeolite in accordance with claim 1 wherein the boron in said zeolite in excess of 100 parts per million is replaced by other metals in a post-synthetic treatment.

5. A zeolite in accordance with claim 4 wherein the replacing metal is a Group IIIA metal or a first row transition metal.

6. A zeolite in accordance with claim 4 wherein the replacing metal is aluminum, chromium, gallium, iron, silicon, zinc and mixtures thereof.

7. A zeolite in accordance with claim 6 wherein the replacing metal is aluminum.

8. A zeolite having a composition, as synthesized and in the anhydrous state, in terms of mole ratios of oxides as follows: (1.0 to 5)Q$_2$O:(0.1 to 1.0)M$_2$O:W$_2$O$_3$(greater than 20)YO$_2$ wherein M is an alkali metal cation, W is selected from boron, or mixtures of boron with aluminum, gallium and iron, Y is selected from silicon, germanium, and mixtures thereof, Q is tricyclodecane quaternary ammonium ion and having the X-ray diffraction lines of Table 1(a).

9. A zeolite prepared by thermally treating the zeolite having a composition, as synthesized and in the anhydrous state, in terms of mole ratios of oxides as follows:

(1.0 to 5)Q$_2$O:(0.1 to 1.0)M$_2$O:W$_2$O$_3$(greater than 20)YO$_2$ wherein M is an alkali metal cation, W is selected from boron, or mixtures of boron with aluminum, gallium and iron, Y is selected from silicon, germanium, and mixtures thereof, q is tricyclodecane quaternary ammonium ion and having the X-ray diffraction lines of Table 1(a) at a temperature from about 200° C. to 820° C. and having X-ray diffraction lines of Table 1(b).

10. A zeolite in accordance with claim 8 wherein the tricyclodecane quaternary ammonium ion is derived from a tricyclo[5.2.1.0$^{2,6}$]decane compound of the formula:

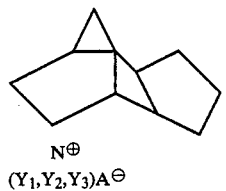

$(Y_1,Y_2,Y_3)A^{\ominus}$ wherein each of $Y_1$, $Y_2$ and $Y_3$ independently is lower alkyl and $A^{\ominus}$ is an anion which is not detrimental to the formation of the zeolite.

11. A tricyclo[5.2.1.0$^{2,6}$]decane compound in accordance with claim 10 wherein each of $Y_1$, $Y_2$ and $Y_3$ independently is methyl or ethyl; $A^{\ominus}$ is OH or halogen.

12. A tricyclo[5.2.1.0$^{2,6}$]decane compound in accordance with claim 10 wherein $Y_1$, $Y_2$ and $Y_3$ are the same and each is methyl; and $A^{\ominus}$ is OH, or I.

13. A zeolite in accordance with claim 1 which has undergone ion exchange with hydrogen, ammonium, rare earth metal, Group IIA metal, or Group VIII metal ions.

14. A zeolite in accordance with claim 1 wherein rare earth metals, Group IIA metals, or Group VIII metals are occluded in the zeolite.

15. A zeolite composition, comprising the zeolite of claim 1 or 8 and an inorganic matrix.

16. A method for preparing the zeolite of claim 1, comprising:
  (a) preparing an aqueous mixture containing sources of a tricyclodecane quaternary ammonium ion, an oxide selected from boron oxide, or mixtures of boron oxide with aluminum oxide, gallium oxide or iron oxide, and an oxide selected from silicon oxide, germanium oxide, and mixtures thereof;
  (b) maintaining the mixture at a temperature of at least 140° C. until the crystals of said zeolite form; and
  (c) recovering said crystals.

17. The method in accordance with claim 16 wherein the aqueous mixture has a composition in terms of mole ratios of oxides falling in the ranges: $YO_2/W_2O_3$, greater than 20; $Q/YO_2$, 0.05:1 to 0.50:1; wherein Y is selected from silicon, germanium, and mixtures thereof, W is selected from boron and mixtures of boron with aluminum, gallium and iron, and Q is a tricyclo[5.2.1.0$^{2,6}$]decane compound.

18. A method in accordance with claim 16 or 17 wherein the tricyclodecane quaternary ammonium ion is derived from a tricyclodecane compound of the formula:

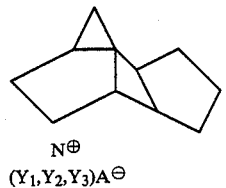

$(Y_1,Y_2,Y_3)A^{\ominus}$ wherein each of $Y_1$, $Y_2$ and $Y_3$ independently is lower alkyl and $A^{\ominus}$ is an anion which is not detrimental to the formation of the zeolite.

19. A method in accordance with claim 18 wherein each of $Y_1$, $Y_2$ and $Y_3$ independently is methyl or ethyl; $A^{\ominus}$ is OH or halogen.

20. A method in accordance with claim 18 wherein $Y_1$, $Y_2$ and $Y_3$ are the same and each is methyl; and $A^{\ominus}$ is OH, or I.

* * * * *